United States Patent [19]
Ohno

[11] Patent Number: 5,774,784
[45] Date of Patent: Jun. 30, 1998

[54] TEMPERATURE CONTROL SYSTEM FOR ELECTRONIC APPARATUS

[75] Inventor: Katsumaru Ohno, Tokyo, Japan

[73] Assignee: NEC Corporation, Tokyo, Japan

[21] Appl. No.: 610,412

[22] Filed: Mar. 4, 1996

[30] Foreign Application Priority Data

Mar. 3, 1995 [JP] Japan ................................ 7-070844

[51] Int. Cl.[6] ................................................. H04B 1/16
[52] U.S. Cl. ........................ 455/343; 455/38.3; 455/574
[58] Field of Search ................................ 455/67.1, 343, 455/38.3, 127, 69, 550, 574; 370/311, 318

[56] References Cited

U.S. PATENT DOCUMENTS

| 4,574,283 | 3/1986 | Arakawa et al. | 340/825.08 |
|---|---|---|---|
| 4,870,698 | 9/1989 | Katsuyama et al. | 455/67.1 |
| 4,939,786 | 7/1990 | McCallum et al. | 455/67.1 |

FOREIGN PATENT DOCUMENTS

| 25521 | 2/1987 | Japan . |
|---|---|---|
| 2-80820 | 6/1990 | Japan . |
| 487429 | 3/1992 | Japan . |
| 2115195 | 9/1983 | United Kingdom . |

Primary Examiner—Reinhard J. Eisenzopf
Assistant Examiner—Lee Nguyen
Attorney, Agent, or Firm—Sughrue, Mion, Zinn, Macpeak & Seas, PLLC

[57] ABSTRACT

A temperature control system for an electronic apparatus including a temperature sensor for detecting the temperature in the apparatus and outputting a temperature detection signal representing the detected temperature, a power supplier controller for generating a battery saving period signal having a pulse width which is inversely proportional to the level of the temperature detection signal from the temperature sensor, and a power supplier for supplying power to an internal apparatus for only a time corresponding to the pulse width of the battery saving period signal from the power supplier controller.

8 Claims, 4 Drawing Sheets

TEMPERATURE CONTROL SYSTEM FOR ELECTRONIC APPARATUS

BACKGROUND OF THE INVENTION

1. Field of the Invention

The present invention relates to a temperature control system for an electronic apparatus for controlling the temperature in the electronic apparatus, and particularly to a temperature control system for an electronic apparatus which has a battery saving function.

2. Description of Related Art

Electronic devices such as a communication apparatus are used not only under the normal temperature, but also under a severe temperature environment such as a desert or a cold region. In such a severe temperature environment, it is indispensable that the temperature of an electronic apparatus is controlled in order to perform a long-term operation of the apparatus and stabilize the operation itself.

Japanese Utility Model Application No. Hei-2-80820 discloses a technique for a communication apparatus having the above type of temperature control system. According to this technique, the temperature in a communication apparatus is detected by a temperature detection sensor unit, and when the temperature detected by the sensor unit reaches a predetermined value, the driving of a fan is controlled by a fan controller to cool the communication apparatus, thereby performing stabilization of the operation of the communication apparatus. Such a communication apparatus, particularly a communication apparatus of TDMA (Time-Division Multiplexing Access) system, is provided with a battery saving function of intermittently actuating a power source means for the purpose of reduction of power consumption of a power source.

This type of communication apparatus is disclosed in Japanese Laid-open Patent Application No. Sho-62-25521. According to this technique, in a system containing a base (host) station, relay stations and low-order stations, when a synchronizing signal containing a battery saving synchronizing signal which is transmitted from the base station is intercepted due to fault of a station, a relay station which is subsequent to the failing station produces a synchronizing signal and transmits the signal to subsequent low-order stations, thereby continuing a battery saving operation.

Figure 5:
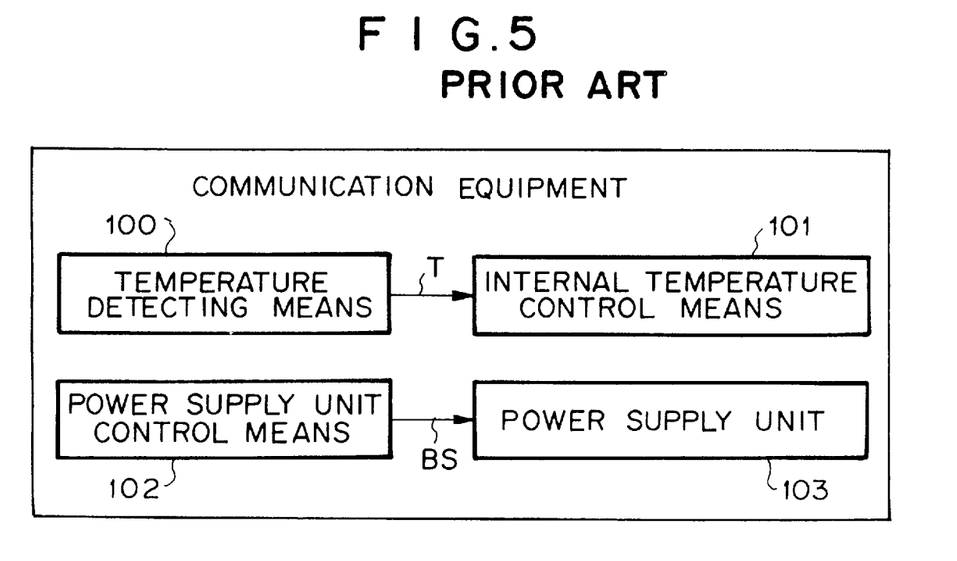
FIG. 5 is a block diagram showing a temperature control system of a conventional communication apparatus.

FIG. 5 is a block diagram showing the construction of the communication apparatus as described above.

In FIG. 5, reference numeral 100 represents temperature detecting means for detecting the temperature in a communication apparatus, and reference numeral 101 represents internal temperature control means which is actuated on the basis of a temperature detection signal T detected by the temperature detecting means 100.

Specifically, when the temperature in the apparatus is high, the temperature detection signal T representing the temperature is output from the temperature detecting means 100 to the internal temperature control means 101, and the internal temperature control means 101 drives a cooling apparatus such as a fan or the like on the basis of the temperature detection signal T to reduce the internal temperature.

Conversely, when the temperature in the apparatus is low, the temperature detection signal T representing the temperature is output from the temperature detecting means 100 to the internal temperature control means 101, and the internal temperature control means 101 drives a heating apparatus such as a heater or the like on the basis of the temperature detection signal T to increase the temperature in the apparatus, whereby the communication apparatus can transmit information with desired power and receive information with desired sensitivity.

Further, reference numeral 102 represents a power supply unit control means for outputting a predetermined battery saving period signal BS to a power supply unit 103, and the power supply unit 103 performs power supply intermittently on the basis of the battery saving period signal BS.

Specifically, the battery saving period signal BS from the power supply unit control means 102 is an H-level rectangular wave having a fixed width which is discretely output at a fixed interval, and the power supply unit 103 is designed so that it is actuated during only the time width of the rectangular wave, and is not actuated at the L-level time. With this design, the power supply unit 103 intermittently supplies the power during the time width of the rectangular of the battery saving period signal BS, thereby reducing the power consumption.

However, the conventional technique as described above must be particularly equipped with the internal temperature control means 101 which is actuated on the basis of the temperature detection signal T detected by the temperature detection means 100, and thus it has a problem that the cost of the communication apparatus rises up and the size thereof increases.

That is, since a fan, a heater, etc. are high in price, and the internal temperature control means 101 which serves to control a fan, a heater, etc. is complicated and high in price, must be installed in the communication apparatus, the total cost of the communication apparatus is increased. In addition, it needs a space in which the internal temperature control means 101 and the large-size fan, heater, etc. are mounted, so that the communication apparatus must be designed in a large scale.

SUMMARY OF THE INVENTION

An object of the present invention is to provide a temperature control system for an electronic apparatus, which can miniaturize the electronic apparatus and reduce the cost thereof.

In order to attain the above object, according to a first aspect of the present invention, a temperature control system for an electronic apparatus includes temperature detecting means for detecting the temperature in the apparatus and outputting a temperature detection signal representing the detected temperature, power supply unit control means for generating a battery saving period signal having a pulse width which is inversely proportional to the level of the temperature detection signal from the temperature detecting means, and a power supply unit for supplying power to an internal apparatus for only a time corresponding to the pulse width of the battery saving period signal from the power supply unit control means.

According to a second aspect of the present invention, in the temperature control system of the first aspect of the present invention, the power supply unit control means includes an A/D converter for converting the temperature detection signal from the temperature detecting means to a digital signal, a battery saving period signal generator for outputting the battery saving period signal to the power supply unit, and a pulse width controller for controlling the pulse width of the battery saving period signal of the battery saving period signal generator to be equal to a value which is inversely proportional to the numerical value of the digital signal from the A/D converter.

According to a third aspect of the present invention, in the temperature control system of the first aspect of the present invention, the power supply unit control means includes first to third battery saving period signal generators for generating battery saving period signals having different pulse widths, a switching unit for switching the outputs of the first to third battery saving period signal generators thereamong, first and second reference voltage generators having different reference voltages, and a judging unit for comparing the level of the temperature detection signal with the reference voltages of the first and second reference voltage generators to control the switching unit in accordance with the comparison result.

According to the temperature control system of the first aspect, the temperature detection signal representing the temperature in the apparatus is input from the temperature detecting means into the power supply unit control means, and the battery saving period signal having the pulse width which is inversely proportional to the level of the temperature detection signal is generated in the power supply unit control means. The power supply unit supplies the power to the internal apparatus for only the time period corresponding to the pulse width of the battery saving period signal from the power supply unit control means. As a result, the heat value of the internal apparatus varies in accordance with the temperature in the apparatus, whereby the temperature in the apparatus is controlled.

According to the temperature control system of the second aspect, the temperature detection signal from the temperature detecting means is converted to a digital signal in the A/D converter of the power supply unit control means, and the pulse width of the battery saving period signal which is output from the battery saving period signal generator to the power supply unit is controlled to be equal to the value which is inversely proportional to the numerical value of the digital signal. Accordingly, in accordance with rise-up of the temperature, the pulse width of the pulse width controller increases and the pulse width of the battery saving period signal is reduced, so that the power supply is reduced to suppress the rise-up of the temperature. Therefore, without the fan, heater, or the like, the whole apparatus can be miniaturized, and the cost thereof can be reduced.

According to the temperature control system of the third aspect, in the judging unit of the power supply unit control means, the level of the temperature detection signal from the temperature detecting means is compared with the reference voltages of the first and second reference voltage generators, and the switching unit is controlled in accordance with the comparison result. With this operation, the outputs of the first to third battery saving period signal generators for generating the battery saving period signals having different pulse widths are switched by the switching unit.

DETAILED DESCRIPTION OF THE PREFERRED EMBODIMENTS

Preferred embodiments according to the present invention will be described hereunder with reference to the accompanying drawings.

(First Embodiment)

Figure 1:
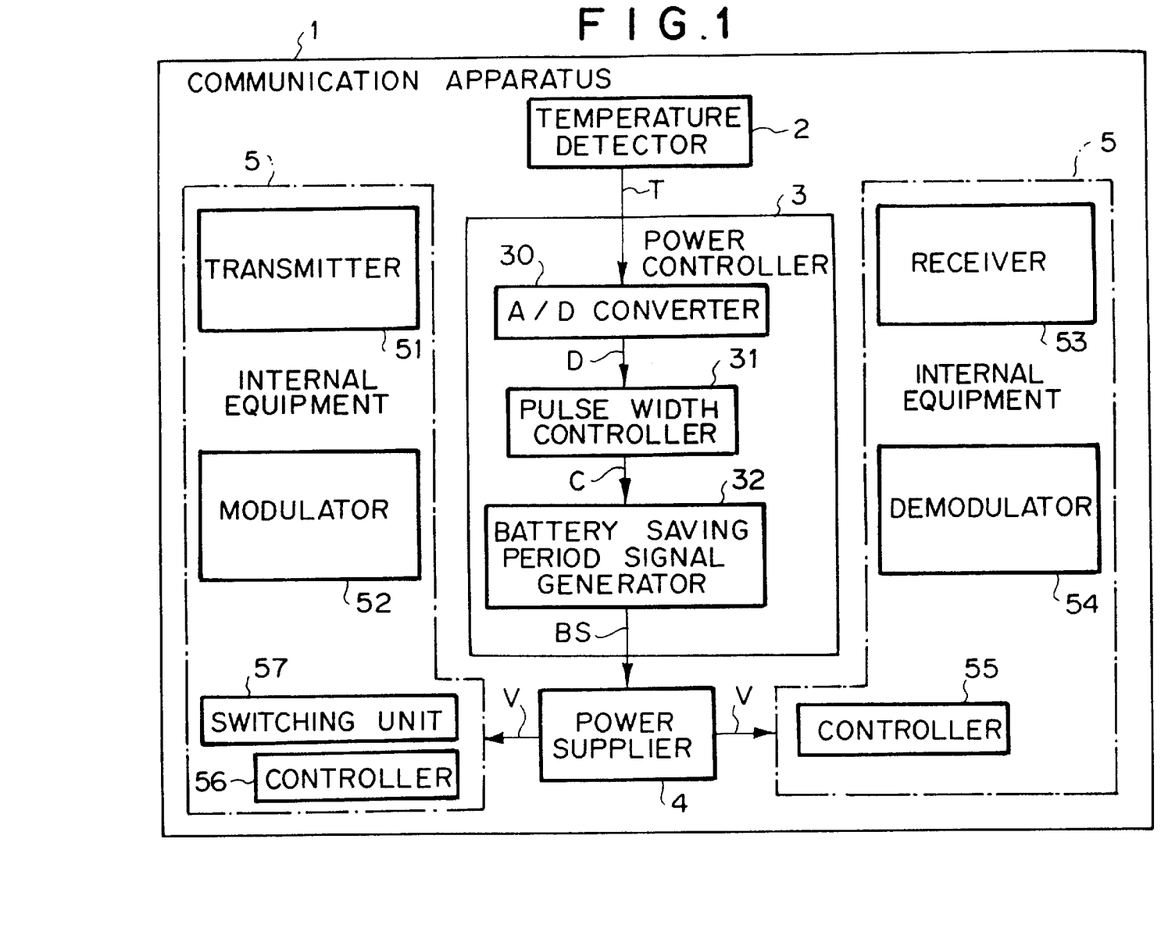
FIG. 1 is a block diagram showing a temperature control system of a communication apparatus according to a first embodiment of the present invention.

FIG. 1 is a block diagram showing a temperature control system for a communication apparatus according to a first embodiment of the present invention.

The temperature control system for a communication apparatus 1 according to this embodiment includes a temperature detector (temperature sensor) 2 serving as temperature detecting means, a power controller 3 serving as power supply unit control means, a power supplier 4 serving as power supply unit, and an internal apparatus 5 containing a transmitter, a receiver, etc., which are disposed in the communication apparatus 1.

The temperature detector 2 is disposed in the communication apparatus 1, particularly at a power stage of the transmitter, and serves to detect the temperature and output a temperature detection signal T. The temperature detection signal T is a signal representing the detected temperature with an analog voltage level. The number of the temperature detector 2 is not limited to one, but plural temperature detectors may be used to output respective analog voltages therefrom.

The power controller 3 generates a battery saving period signal BS whose pulse width is inversely proportional to the voltage level of the temperature detection signal T from the temperature detector 2, and supplies the signal BS to the power supplier 4. The power controller 3 has an A/D converting circuit 30 serving as an A/D converter, a pulse width control circuit 31 serving as the pulse width controller, and a battery saving period signal generating circuit 32 serving as a battery saving period signal generator.

The A/D converting circuit 30 receives the analog temperature detection signal T from the temperature detector 2 and converts the input signal to a digital signal D.

The pulse width control circuit 31 outputs to the battery saving period signal generating circuit 32 a control signal C to generate the battery saving period signal BS whose pulse width is inversely proportional to the numerical value of the digital signal D from the A/D converting circuit 30.

The battery saving period signal generating circuit 32 generates the battery saving period signal BS whose pulse width is specified on the basis of the control signal C from the pulse width control circuit 31, and outputs the signal BS to the power supplier 4.

When plural temperature detectors (temperature sensors) are disposed in the internal apparatus 5, the output voltages of the respective temperature sensors are input to the respective A/D converting circuits 30, and the output of each temperature detector 2 is compared with the reference voltage corresponding to each reference temperature in the A/D converting circuit 30. If the comparison output is large, the digital signal D corresponding to the large temperature detection signal T is output. Therefore, the pulse width control circuit 31 outputs a control signal C for generating the battery saving period signal BS whose pulse width is inversely proportional to the numerical value of the digital signal D from the A/D converting circuit 30.

The power supplier 4 is set to an ON state for only the time corresponding to the pulse width of the battery saving period signal BS from the battery saving period signal generating circuit 32 of the power controller 3, and it supplies the power voltage V to the internal apparatus 5 during that time.

When the communication apparatus 1 is a transceiver, the internal apparatus 5 includes a transmitter 51 for transmitting radio wave, a modulator 52 for outputting a modulated signal to the transmitter, a receiver 53 for receiving radio wave, a demodulator 54 for demodulating the signal received by the receiver, and controllers 55, 56 for controlling the above elements. Further, when the communication apparatus 1 is a relay transmitter, the internal apparatus includes the transmitter 51 for transmitting radio wave, the modulator 52 for outputting a modulated signal to the transmitter, the receiver 53 for receiving radio wave, the demodulator 54 for demodulating the signal received by the receiver, a switching unit 57 for switching a transmission/reception channel to a desired channel, and the controllers 55, 56 for controlling the above elements.

Next, an operation of the temperature control system of this embodiment will be described.

Figure 2A:
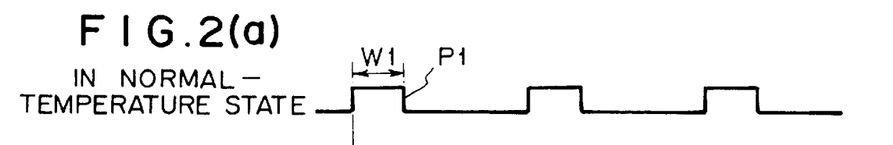
FIG. 2 is a waveform diagram of a battery saving period signal output at each temperature, wherein (a) represents a waveform at the normal temperature, (b) represents a waveform at a low temperature, and (c) represents a waveform at a high temperature.
Figure 2B:
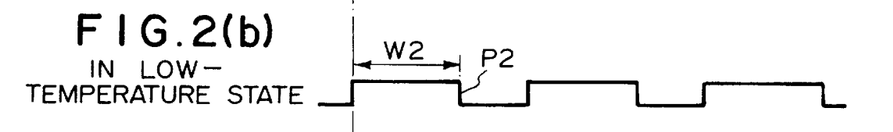
Figure 2C:
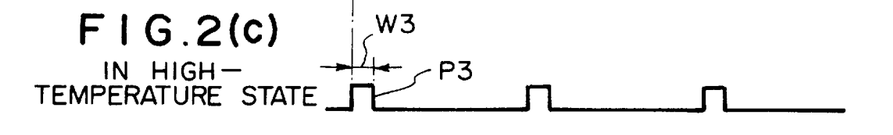

FIG. 2 is a waveform diagram of the battery saving period signal which is output during the operation under each temperature. At a battery saving time, a monitor unit for monitoring a radio wave state at all times usually monitors a calling from another station or that it is under transmission, and thus a battery saving period is indicated by the monitor.

When the communication apparatus 1 is used at the normal temperature, the temperature in the communication apparatus 1 is detected by the temperature detector 2, and the temperature detection signal T which is indicative of the temperature with analog voltage level is output from the temperature detector 2 to the A/D converting circuit 30 of the power controller 3.

The temperature detection signal T is converted to the digital signal D by the A/D converting circuit 30, and then input to the pulse width control circuit 31. In the pulse width control circuit 31, the control signal C to generate the battery saving period signal BS whose pulse width is inversely proportional to the numerical value of the digital signal D is generated, and output to the battery saving period signal generating circuit 32.

Here, such a control signal C (for example, a trigger signal indicating rise-up and falling of a pulse) as to generate a battery saving period signal BS having a pulse P1 whose pulse width W1 is in an intermediate level as shown in (a) of FIG. 2 are output from the pulse width control circuit 31 to the battery saving period signal generating circuit 32. As a result, in the battery saving period signal generating circuit 32, the battery saving period signal BS as shown in (a) of FIG. 2 is generated, and output to the power supplier 4.

With this operation, the power supplier 4 is intermittently switched on for only the time period corresponding to the pulse width W1 of the pulse P1, and the power source voltage V is supplied to the internal apparatus 5 at that time interval. As a result, the temperature in the communication apparatus 1 is kept at the normal temperature due to the heating of the internal apparatus 5.

When the communication apparatus 1 as described above is used in a cold district, the temperature in the communication apparatus 1 rapidly decreases from the normal temperature to a low temperature, and this also reduces the voltage level of the temperature detection signal T output from the temperature detector 2, so that the numerical value of the digital signal D which is converted and output by the A/D converting circuit 30 is also reduced.

When this digital signal D is input to the pulse width control circuit 31, the control signal C to increase the pulse width of the battery saving period signal BS in inverse proportion to the numerical value of the digital signal D is output to the battery saving period signal generating circuit 32. With this operation, the battery saving period signal BS having pulses whose pulse width is long is generated in the battery saving period signal generating circuit 32. That is, as shown in (b) of FIG. 2, the pulse of the battery saving period signal BS varies from the pulse P1 having the pulse width W1 to the pulse P2 having the pulse width W2, and then it is output to the power supplier 4. As a result, the ON-state time of the power supplier 4 is lengthened, and the heat value of the internal apparatus 5 is increased, so that the temperature in the communication apparatus 1 rises up from the low temperature to the normal temperature.

Further, when the communication apparatus at the normal temperature state is used in a tropical district such as a desert or the like, the temperature in the communication apparatus 1 rapidly rises up from the normal temperature to a high temperature. Accordingly, the voltage level of the temperature detection signal T which is output from the temperature detector 2 increases, and the numerical value of the digital signal D which is converted and output by the A/D converting circuit 30 is also increased. Upon input of the digital signal D into the pulse width control circuit 31, the control signal C to decrease the pulse width of the battery saving period signal BS in inverse proportion to the numerical value of the digital signal D is output to the battery saving period signal generating circuit 32. With this operation, the battery saving period signal BS having the pulse whose pulse width is short is generated in the battery saving period signal generating circuit 32. That is, as shown in (c) of FIG. 2, the pulse of the battery saving period signal BS varies from the pulse P1 having the pulse width W1 to the pulse P3 having the short pulse width W3, and then it is output to the power supplier 4. As a result, the ON-state time of the power supplier 4 is shortened, and the heat value of the internal apparatus 5 is reduced, so that the temperature in the communication apparatus 1 decreases from the high temperature to the normal temperature.

As described above, according to the temperature control system of the communication apparatus of the first embodiment, the control of the temperature in the apparatus can be performed without using the high-price fan, heater, etc., and the complicated and high-price internal temperature control means 101 for controlling the fan, the heater, etc., so that the total cost of the communication apparatus 1 can be reduced. Further, no space to secure the large-size fan, heater, etc. is required, and thus the entire body of the communication apparatus 1 can be miniaturized.

(Second Embodiment)

Next, a temperature control system according to a second embodiment of the present invention will be described.

This embodiment is different from the first embodiment in the structure of the power controller.

Figure 3:
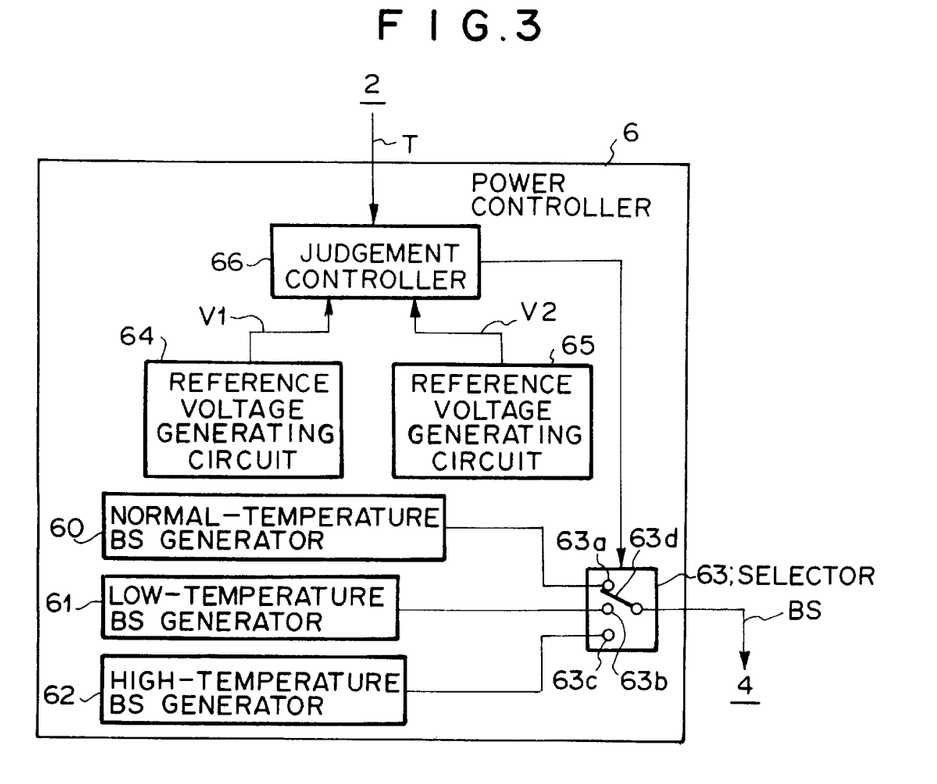
FIG. 3 is a block diagram showing a power controller which is main part of a second embodiment of the present invention.

FIG. 3 is a block diagram showing a power controller which is a main part of this embodiment.

As shown in FIG. 3, the power controller 6 includes a normal temperature BS generating circuit 60, a low-temperature BS generating circuit 61 and a high-temperature BS generating circuit 62 which serve as the first to third battery saving period signal generators, a selector 63 serving as the switching unit, reference voltage generating circuits 64 and 65 which serve as the first and second reference voltage generators, and a judging control circuit 66 serving as the judging unit.

The normal-temperature BS generating circuit 60 generates a battery saving period signal BS having the waveform shown in (a) of FIG. 2, the low-temperature BS generating circuit 61 generates a battery saving period signal BS having the waveform shown in (b) of FIG. 2, and the high-temperature BS generating circuit 62 generates a battery saving period signal BS having the waveform shown in (c) of FIG. 2.

The selector 63 includes an output terminal 63a of the normal-temperature BS generating circuit 60, an output terminal 63b of the low-temperature BS generating circuit 61, an output terminal 63c of the high-temperature BS generating circuit 62, and a movable contact point 63d which can be electrically connected to these terminals 63a to 63c. This selector 63 performs a switching operation of the movable contact point 63d in accordance with a switching control signal S from the judging control circuit 66 as described later.

The reference voltage generating circuits 64 and 65 output respective reference voltages V1 and V2 to the judging control circuit 66, respectively. The reference voltage V2 is set to be larger than the reference voltage V1, and a voltage which is lower than the reference voltage V1 corresponds to a voltage under the low-temperature state. A voltage between the reference voltages V1 and V2 corresponds to a voltage under the normal-temperature state, and a voltage which is higher than the reference voltage V2 corresponds to a voltage under the high-temperature state.

The judging control circuit 66 receives the temperature detection signal T output from the temperature detector 2 and the reference voltages V1 and V2 output from the reference voltage generating circuits 64 and 65 to judge a voltage range (a low-temperature voltage range, a normal-temperature voltage range or a high-temperature voltage range) in which the voltage level of the temperature detection signal T is located. In accordance with the judgment result, the switching control signal S to control the selector 63 is output to the selector 63.

Specifically, when the voltage corresponding to the temperature detection signal T is judged to be lower than the reference voltage V1, the judging control circuit 66 supplies the selector 63 with the switching control signal S to instruct the movable contact point 63d to come into contact with the output terminal 63b of the low-temperature BS generating circuit 61.

Further, when the voltage corresponding to the temperature detection signal T is judged to be located between the reference voltages V1 and V2, the judging control circuit 66 supplies the selector 63 with the switching control signal S to instruct the movable contact point 63d to come into contact with the output terminal 63a of the normal-temperature BS generating circuit 60.

Still further, when the voltage corresponding to the temperature detection signal T is judged to be higher than the reference voltage V2, the judging control circuit 66 supplies the selector 63 with the switching control signal S to instruct the movable contact point 63d to come into contact with the output terminal 63c of the high-temperature BS generating circuit 62.

According to the temperature control system as described above, when a communication apparatus is used under the normal temperature state, the temperature in the communication apparatus is detected by the temperature detector 2, and a temperature detection signal T which represents the detected temperature with a voltage level is output from the temperature detector 2 to the judging control circuit 66 of the power controller 6. In this case, since the communication apparatus is used under the normal-temperature state, the voltage of the temperature detection signal T is located between the reference voltages V1 and V2. Therefore, the judging control circuit 66 outputs to the selector 63 a switching control signal S to keep the contact state between the movable contact point 63d and the output terminal 63a of the normal-temperature BS generating circuit 60.

As a result, the battery saving period signal BS having the waveform shown in (a) of FIG. 2 is output from the normal-temperature BS generating circuit 60 through the selector 63 to the power supplier 4. Therefore, the power supplier 4 is intermittently set to the ON-state for only the time corresponding to the pulse width W1 of the pulse P1, and the power voltage V is supplied to the internal apparatus at the time interval, so that the temperature in the communication apparatus is kept to the normal temperature state.

When the communication apparatus is used in a cold district, the temperature in the communication apparatus rapidly decreases from the normal temperature to the low temperature, and thus the voltage level of the temperature detection signal T which is input from the temperature detector 2 to the judging control circuit 66 is also reduced. Therefore, the voltage of the temperature detection signal T is reduced to a value which is lower than the reference voltage V1, and thus the switching control signal to bring the movable contact point 63d into contact with the output terminal 63b of the low-temperature BS generating circuit 61 is output from the judging control circuit 66 to the selector 63.

As a result, the battery saving period signal BS having the waveform shown in (b) of FIG. 2 is output from the low-temperature BS generating circuit 61 through the selector 63 to the power supplier 4. With this operation, the ON-state time of the power supplier 4 is lengthened, so that the heat value of the internal apparatus increases and the temperature of the inside of the communication apparatus rises up from the low temperature to the normal temperature.

Further, when the communication apparatus under the normal temperature state is used in a tropical district such as a desert or the like, the temperature in the communication apparatus rapidly rises up from the normal temperature to the high temperature, and thus the voltage level of the temperature detection signal T output from the temperature detector 2 also increases.

Therefore, the voltage of the temperature detection signal T increases to a value which is larger than the reference voltage V2, and the switching control signal S to bring the movable contact point 63d into contact with the output terminal 63c of the high-temperature BS generating circuit 62 is output from the judging control circuit 66 to the selector 63. Therefore, the battery saving period signal BS having the waveform shown in (c) of FIG. 2 is output from the high-temperature BS generating circuit 62 through the selector 63 to the power supplier 4. With this operation, the ON-state time of the power supplier 4 is shortened, so that the heat value of the internal apparatus 5 is reduced and thus the temperature in the communication apparatus is reduced from the high temperature to the normal temperature.

The other construction, the operation and the effects of this embodiment are identical to those of the first embodiment, and the description thereof is omitted.

( Third Embodiment )

Figure 4:
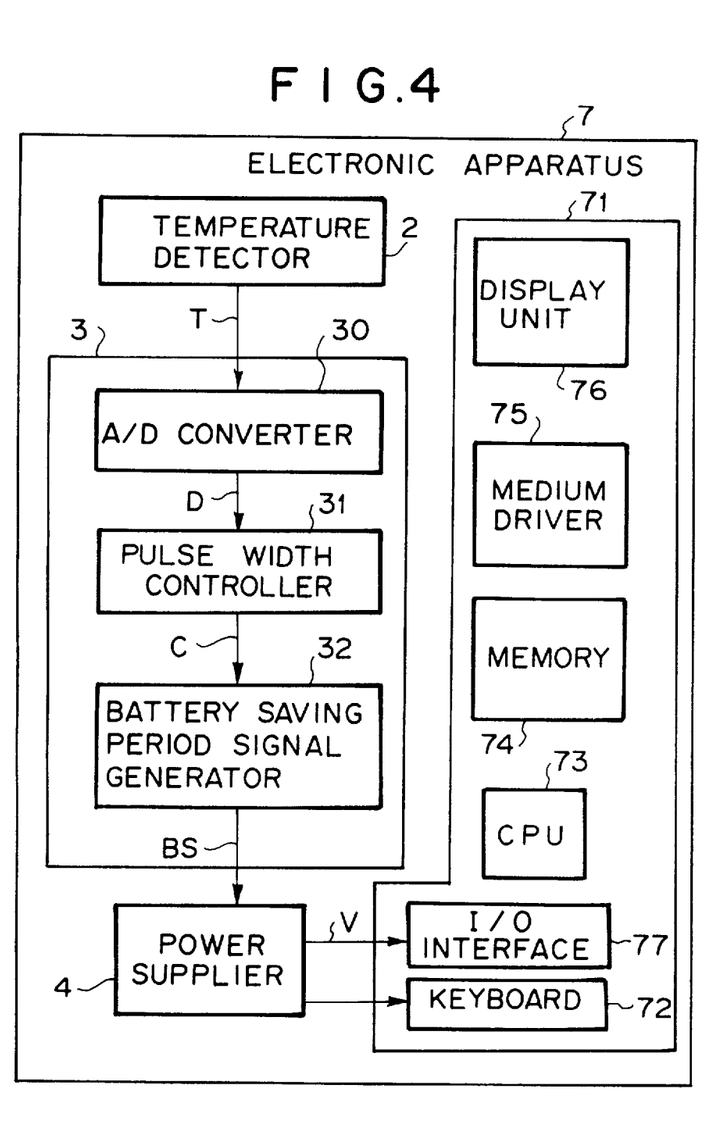
FIG. 4 is a block diagram showing a temperature control system of a computer apparatus according to a third embodiment of the present invention.

Next, a temperature control system for an electronic apparatus, particularly a computer apparatus according to a third embodiment of the present invention will be described with reference to FIG. 4.

Like the first embodiment, the temperature control system for a computer apparatus 7 includes a temperature detector 2 serving as the temperature detecting means, a power controller 3 serving as the power supplier control means, a power supplier 4 serving as the power supply unit, and an internal apparatus 71 having a CPU, a memory, etc., which are installed in a computer 7. The internal apparatus 71 includes an input keyboard 72 which monitors a input operation and also a trigger at the saving time, a CPU 73 for performing various processing and all control operations, a memory 74 such as RAM, ROM, EEPROM, flash memory, etc., a medium driver 75 such as FD, HD, etc., a display unit 76, and an I/O interface 77, and the construction of the internal apparatus 71 is not limited to the above construction.

The temperature detector 2 is disposed especially at the side of the CPU 73 in the computer apparatus, for which the temperature is particularly required to be fixed to a constant temperature. The temperature detector 2 detects the temperature of the CPU 7, and outputs the detected temperature as a temperature detection signal T. An A/D converting circuit 30 converts the temperature detection signal T to a digital signal D, and a pulse width control circuit 31 calculates a difference value between the value of the digital signal D and the digital value corresponding to a reference temperature, and outputs as a control signal C rising and falling trigger signals or a sawtooth-wave pulse for being able to be cut by DC varying level to make the pulse width in inverse proportion to the pulse width corresponding to the reference temperature.

The battery saving period signal generating circuit 32 performs the same operation as described above with reference to FIG. 2 to switch on or off the power supplier 4, so that the internal temperature of the computer apparatus 7 is kept to be constant at the battery saving time. At the power saving time, for example when the keyboard is not touched for a predetermined time or when no medius is inserted for a predetermined time, a monitoring unit judges whether a saving operation is started, and it instructs the power supplier to start its intermittent power saving operation. With this operation, the operation speed of the internal apparatus can be kept to a fixed value through the temperature control, so that the malfunction of the apparatus can be prevented and the function of the medium driver can operate normally at all times.

As described above, according to the temperature control system for the electronic apparatus of the present invention, the temperature in the apparatus can be controlled by the temperature detecting means, the power supply unit control means and the power supply unit, and thus the temperature control system of this invention never needs the complicated and high-price internal temperature control means 101 for controlling a fan, a heater, etc., and a fan, a heater, etc. which are high in price. Therefore, the total cost of the electronic apparatus can be reduced.

Further, the system needs no space in which the internal temperature control means 101, the large-size fan and heater, etc. are mounted, so that the whole size of the electronic apparatus can be reduced.

What is claimed is:

1. A temperature control system for an electronic apparatus comprising:

temperature detecting means for detecting the temperature in the apparatus and outputting a temperature detection signal representing the detected temperature;

power supply unit control means for generating a battery saving period signal having a pulse width which is inversely proportional to the level of the temperature detection signal from said temperature detecting means, wherein said power supply unit control means includes an A/D converter for converting the temperature detection signal from said temperature detecting means to a digital signal, a battery saving period signal generator for outputting the battery saving period signal, and a pulse width controller for controlling the pulse width of the battery saving period signal generator to be inversely proportional to the value of the digital signal from said A/D converter; and a power supply unit for receiving the battery saving period signal from said power supply unit control means and supplying power to an internal apparatus for only a time corresponding to the pulse width of the battery saving period signal from said power supply unit control means.

2. The temperature control system as claimed in claim 1, wherein said internal apparatus includes at least one of a transmitter for transmitting a radio wave, a modulator for outputting a modulated signal to said transmitter, a receiver for receiving a radio wave, a demodulator for demodulating the signal received by said receiver, and controllers for controlling each of said transmitter, said modulator, said receiver and said demodulator.

3. The temperature control system as claimed in claim 1, wherein said internal apparatus includes at least one of a transmitter for transmitting a radio wave, a modulator for outputting a modulated signal to said transmitter, a receiver for receiving a radio wave, a demodulator for demodulating the signal received by said receiver, a switching unit for switching a transmission/reception channel to a desired channel, and controllers for controlling each of said transmitter, said modulator, said receiver, said demodulator and said switching unit.

4. The temperature control system as claimed in claim 1, wherein said internal apparatus includes a keyboard, a CPU, a memory containing a RAM, a ROM and a flash memory, and a medium driver for driving a medium which is loaded from an external source.

5. A temperature control system for an electronic apparatus comprising:

temperature detecting means for detecting the temperature in the apparatus and outputting a temperature detection signal representing the detected temperature;

power supply unit control means for generating a battery saving period signal having a pulse width which is inversely proportional to the level of the temperature detection signal from said temperature detecting means, wherein said power supply unit control means includes first, second and third battery saving period signal generators for generating battery saving period signals having different pulse widths, a switching unit for switching between the outputs of said first, second and third battery saving period signal generators, first and second reference voltage generators having different reference voltages, and a judging unit for comparing the level of the temperature detection signal with the reference voltages of said first and second reference voltage generators to control said switching unit in accordance with the comparison result; and a power supply unit for supplying power to an internal apparatus for only a time corresponding to the pulse width of the battery saving period signal from said power supply unit control means.

6. The temperature control system as claimed in claim 5, wherein said internal apparatus includes at least one of a transmitter for transmitting a radio wave, a modulator for outputting a modulated signal to said transmitter, a receiver for receiving a radio wave, a demodulator for demodulating the signal received by said receiver, and controllers for controlling each of said transmitter, said modulator, said receiver and said demodulator.

7. The temperature control system as claimed in claim 5, wherein said internal apparatus includes at least one of a transmitter for transmitting a radio wave, a modulator for outputting a modulated signal to said transmitter, a receiver for receiving a radio wave, a demodulator for demodulating the signal received by said receiver, a switching unit for switching a transmission/reception channel to a desired channel, and controllers for controlling each of said transmitter, said modulator, said receiver, said demodulator and said switching unit.

8. The temperature control system as claimed in claim 5, wherein said internal apparatus includes a keyboard, a CPU, a memory containing a RAM, a ROM and a flash memory, and a medium driver for driving a medium which is loaded from an external memory.

\* \* \* \* \*